United States Patent

[11] 3,554,340

[72] Inventors Keizo Shimano and
 Masashi Nagano, both c/o
 Shimano Industry Company, No. 77, 3-cho,
 Oimatu-cho, Sakai, Japan
[21] Appl. No. 797,912
[22] Filed Feb. 10, 1969
[45] Patented Jan. 12, 1971
[32] Priority Oct. 2, 1968
[33] Japan
[31] 43/85824

[54] FREE WHEEL FOR A BICYCLE
 3 Claims, 2 Drawing Figs.
[52] U.S. Cl. .................................................. 192/64
[51] Int. Cl. .................................................. F16d 41/18
[50] Field of Search ........................................ 192/64, 6;
 308/192; 74/750(B)

[56] References Cited
 UNITED STATES PATENTS
| | | | |
|---|---|---|---|
| 2,211,548 | 8/1940 | Schwinn ..................... | 192/64 |
| 2,226,247 | 12/1940 | Lesage ........................ | 192/64 |
| 3,147,641 | 9/1964 | Schwerdhofer .............. | 192/6(A)(X) |

*Primary Examiner*—Allan D. Herrmann
*Attorney*—Moonray Kojima

ABSTRACT: A freewheeling hub apparatus for bicycle having a recess formed by extension of a driving element and a driven element, and in which recess is provided a sealing device which is attachable to the driving element and which has a lip portion which abuts the driven element, thereby to keep out contaminants from the opening between the driving element and driven element.

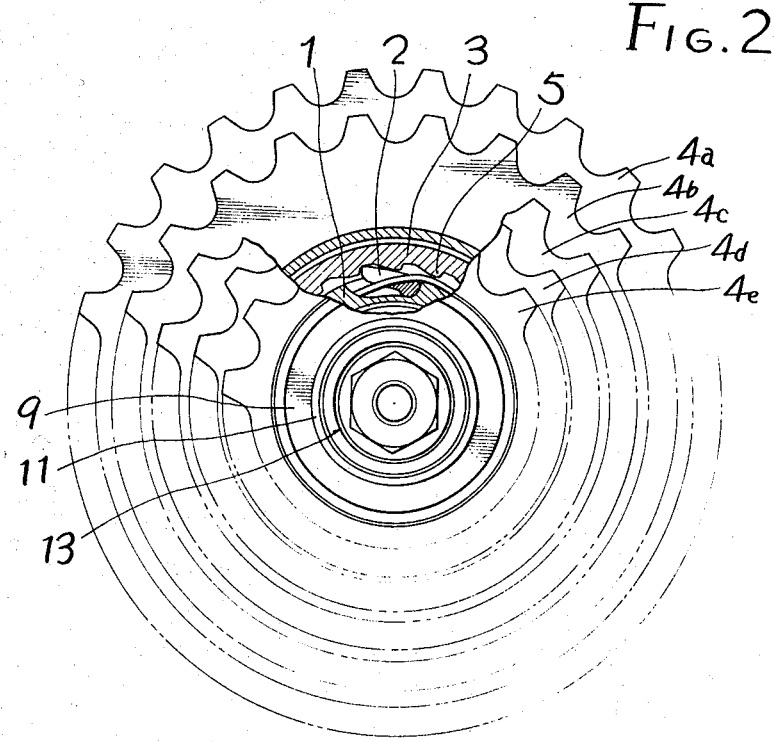

FREE WHEEL FOR A BICYCLE

This invention is related to the free wheel for a bicycle. Generally speaking, the free wheel for a bicycle, especially to be used for the gear shifting system thereof is composed of a freewheel-mounting body threaded to the screw element of the wheel hub, the driven element and the driving element of the main freewheel body whereupon a desired number of sprockets are fixedly mounted, and as a whole the construction of the free wheel is made in such a manner as to provide a ratchet wheel between these driven element and driving element in order that the movement of the main freewheel body (driving element) can be transmitted in a unilateral direction thereof to said sprocket mounting body (driven element). Furthermore, between these driven element and driving element there is formed a comparatively largely spatial room with the ratchet wheel at its center.

However, according to the aforementioned gear shifting system and especially such a gear shifting console mounted outwardly of the bicycle, it is quite impossible to protect the exteriors thereof with such a fitting means for example as a chain case, and these give rise to the deficiencies that foreign matters like dust, mud, rainwater or a mixture thereof are apt to penetrate into said spatial room through the opening of the bearing elements and consequently the ratchet wheel easily becomes rusty enough to keep on running idle at the very time when it is in due turn to rotate fully for forward movement, or at best rotate excessively slowly quite of no practical use.

The present invention has been made to get emancipated from these conventional defects, having as one of its principal objectives a provision of such a free wheel for a bicycle as to prevent foreign matters like dust, mud , rainwater or a mixture thereof from penetrating into the opening formed in the driven element portions and the driving element portions of the free wheel, and further having another objective of the invention a provision of the bicycle free wheel provided with such a construction as to prevent the penetration of alien substances and be mounted easily and steadily in any small opening of the free wheel.

In other words, the present invention is featured with the best use of the following two facts to adopt lip-piece-provided sealing devices in such a manner as to rigidly attach the same onto the sprocket mounting body so that the lip piece of said sealing devices can be brought into contact with the main sprocket body (driven element); that is, in practical use, the so-called freewheeling state of the free wheel where the driven element is driven in moving relation with the driving element is substantially very slight as compared with the case where the former is left out of moving relation with the latter, and also in the normal case the main sprocket body is formed lengthy in the direction of its axis.

The detailed explanation of the present invention is as set forth in the succeeding with reference to the accompanying drawings and the novel features of the invention are as fully defined in what is claimed.

Now referring to each FIG. of the accompanying drawings:

FIG. 2 is a flank view partially showing cut in section.

Figure 1:
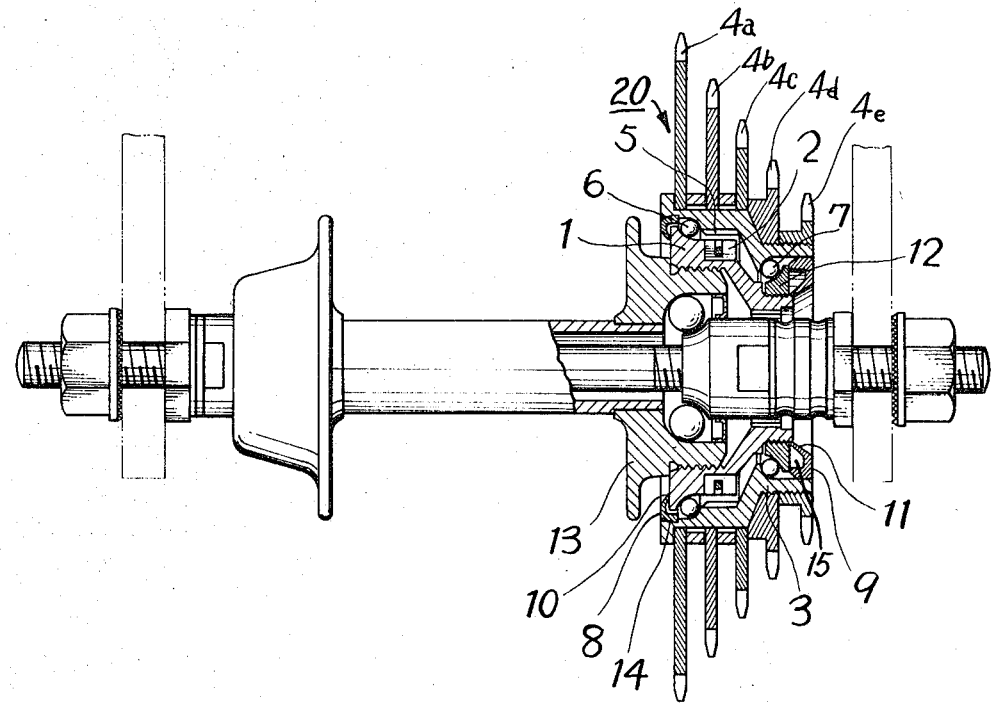
FIG. 1 is a vertical section view showing a type of the free wheel embodied in accordance with the invention.

In the drawings, FIGS. 1 and 2, depict a freewheeling hub apparatus 20, and reference numeral 1 designates a sprocket mounting body of socket shape to be screwed up to the rear wheel hub 13 of the bicycle and on the outer peripheral portion of said sprocket mounting body 1 are formed pawls 2. A main sprocket body 3 is in its outer periphery provided fixedly with five pieces of sprocket wheels 4a, 4b, 4c, 4d and 4e each of which is made different in diameter respectively. In the inside of said main sprocket body 3 is formed a ratchet of inwardly faced teeth 5 corresponding with the pawls. The number of the sprocket wheel may be optional and the present invention is applicable to the free wheel provided with a singularity of the sprocket as well.

Said sprocket body 3 is supported on the sprocket mounting body 1 through means of ball bearings 6 and 7 in such a manner that when this sprocket body 3 rotates clockwise, the ratchet of the teeth 5 and the pawls 2 come into engagement with each other to transmit this rotation as far as the sprocket mounting body 1, while on the contrary when the main sprocket body 3 rotates counterclockwise, said teeth 5 and pawls 2 are not engaged whereby no rotation is transmitted as far as the sprocket mounting body 1.

To recapitulate, the free wheeling hub apparatus 20 operates in a conventional manner. A chain, not shown, driven usually by a foot pedal, turns the sprockets 4 (depending on the speed desired a particular sprocket is selected which is attached to main sprocket body 3. When the body 3 rotates in the clockwise direction (see FIG. 2 the pawls 2 are engaged in ratchet 5. Thus, the clockwise rotation is transmitted to support means 1. When the main sprocket body 3 stops rotation (due to stopping of the foot pedal) or becomes slower than the speed of the means 1, the pawls 2 come out of engagement and body 1 continues to rotate. When the main sprocket body 3 is driven in a counterclockwise direction, the pawls 2 do not engage the ratchet 5 and the support means or body 1 is not rotated in the counterclockwise direction.

The main sprocket body 3 in FIG. 1 is constructed a little longer in the direction of its axis than the sprocket mounting body 1 and the former is protruded out of each extremity of the latter. Among each extremity of the sprocket mounting body 1 and the inner periphery of the protruded portions of the main sprocket body 3 there is formed a spatial room 15. Reference numerals 8 and 9 designate respectively the sealing devices provided with lip pieces 10 and 11 of taper shape attached in this spatial room on to the inner periphery of the protruded portions of the main sprocket body 3. Incidentally, the attaching method of the sealing devices is carried out by forming an annular channel 14 which may be notched as depicted, in the flank portion of the hub 13 of the main sprocket body 3 and attaching a part of the sealing device onto said channel 14, or , instead of forming such an annular channel 14, by attaching the sealing devices directly, such as by means of screw, glue, welding, or other fasteners, onto the inner periphery of the main sprocket body 3, such as depicted on the right hand end of body 3.

Each lip piece 10 and 11 of the sealing device 8 and 9 is in abutment either against the foremost edge of the sprocket mounting body 1 or against the flank of the bearing flange 12 screwed to the outer periphery of the sprocket mounting body 1. The lip pieces 10 and 11 of the sealing devices 8 and 9 are preferably composed of materials of slight resiliency, small abrasion and small coefficient of friction such as synthetic resin materials. As depicted, the lip portions may be thinner than the body portions.

As has been mentioned above, the main sprocket body of the present invention is constructed a little longer in the direction of its axis than the sprocket mounting body, and between the formost edge of this sprocket mounting body and the inner periphery of the free wheel there is formed a spatial room, wherein the lip piece-provided sealing devices are fixedly attached such as by snapping into the notched channels or by means of fasteners, to the body 3, with each lip piece of said sealing devices in abutment against the sprocket mounting body.

Accordingly, the opening formed in the portion where the free wheel rotates is sheltered with said sealing devices and this portion is perfectly protected against the penetration of foreign matters like dust, mud, rainwater or a mixture thereof thereby making it possible to rotate the free wheel vary smoothly at all times and eliminate the conventional difficulties that the ratchet wheel would not work or at best keep on running idle even when the free wheel rotates for forward movement.

According to the present invention, the attachment of the sealing devices is made very fast and tightly since use is made of said spatial room in order to make this attachment onto the inner periphery of the main sprocket body, and furthermore this attachment can be made in a very easy and simple manner since use is made of the main sprocket body itself to attach the sealing devices thereto.

All that have been referred hereinto as the embodiments of the invention are just to give a definite understanding of the invention and it is to be noted that these do not altogether restrict the scope and spirit of the invention within the disclosure that has been made, since what have been disclosed herein are only illustrative of the invention and not restrictive thereof.

We claim:

1. A free wheeling hub arrangement for a bicycle comprising:

a cylindrical bicycle rear wheel hub with external threads at one axial end;

a cylindrical rotatable sprocket mounting body with internal threads at one axial end, said external and internal threads couple said rear wheel hub and sprocket mounting body together;

a cylindrical rotatable main sprocket body having two axial ends and an axial length longer than said sprocket mounting body, said sprocket body being mounted concentrically on said sprocket mounting body whereby an opening is provided therebetween and a spatial room is formed between the respective ends of said sprocket mounting body and end portions of said sprocket body;

bearing means positioned between parts of said sprocket mounting body and parts of said sprocket body;

means positioned between said sprocket mounting body and said sprocket mounting body and said sprocket body for enabling said sprocket body to move said sprocket mounting body in one rotational direction for particular conditions and for enabling said sprocket mounting body to move independently of said sprocket means for other conditions; and characterized by cylindrical sealing devices positioned within each of said spatial rooms and attached to said sprocket body, said sealing devices comprising a lip portion extending from said sprocket body toward and abutting said sprocket mounting and covering said opening between said sprocket body and said sprocket body.

2. The arrangement of claim 1, wherein a notched annular channel is formed toward one end of said main sprocket body and within said spatial room, and wherein one of said sealing devices is attached to said channel.

3. The arrangement of claim 1, wherein said lip portions are substantially thinner in cross section than the remaining portions of said sealing devices.